Nov. 11, 1958  J. A. TOMCHAK  2,859,609
TIRE TESTING RACK
Filed Dec. 24, 1954

INVENTOR.
JOSEPH A. TOMCHAK.
BY Archworth Martin
his ATTORNEY

United States Patent Office 2,859,609
Patented Nov. 11, 1958

2,859,609
TIRE TESTING RACK
Joseph A. Tomchak, McKees Rocks, Pa.
Application December 24, 1954, Serial No. 477,515
2 Claims. (Cl. 73—45.5)

My invention relates to apparatus for testing pneumatic tires for leaks, and is herein shown and described as employed more particularly in the testing of tubeless tires on their wheels, although it can be used also for the testing of the inner tubes of pneumatic tires, for punctures.

It is important that in the case of tubeless tires tests be made when the tire is on the wheel, to insure that there is no leakage of air between the tire bead and the rim flange.

My invention has for one of its objects the provision of a simple and effective means for conveniently handling the tires to be tested and moving them into and out of a water tank.

Another object of my invention is to provide an improved arrangement of supporting apparatus wherein there is, in effect, a counterbalancing of the tire, to facilitate its movement into and out of the water.

Still another object of my invention is to provide an improved arrangement of supporting apparatus, whereon the wheel that carries the tire is rotatably supported in a simple and effective manner on its own axis against accidental displacement during the operation of testing the tire for leaks, and is also rotatable on a radial axis, to facilitate presentation of both faces to the view of the operator.

As shown in the accompanying drawings.

Figures 1, 2:
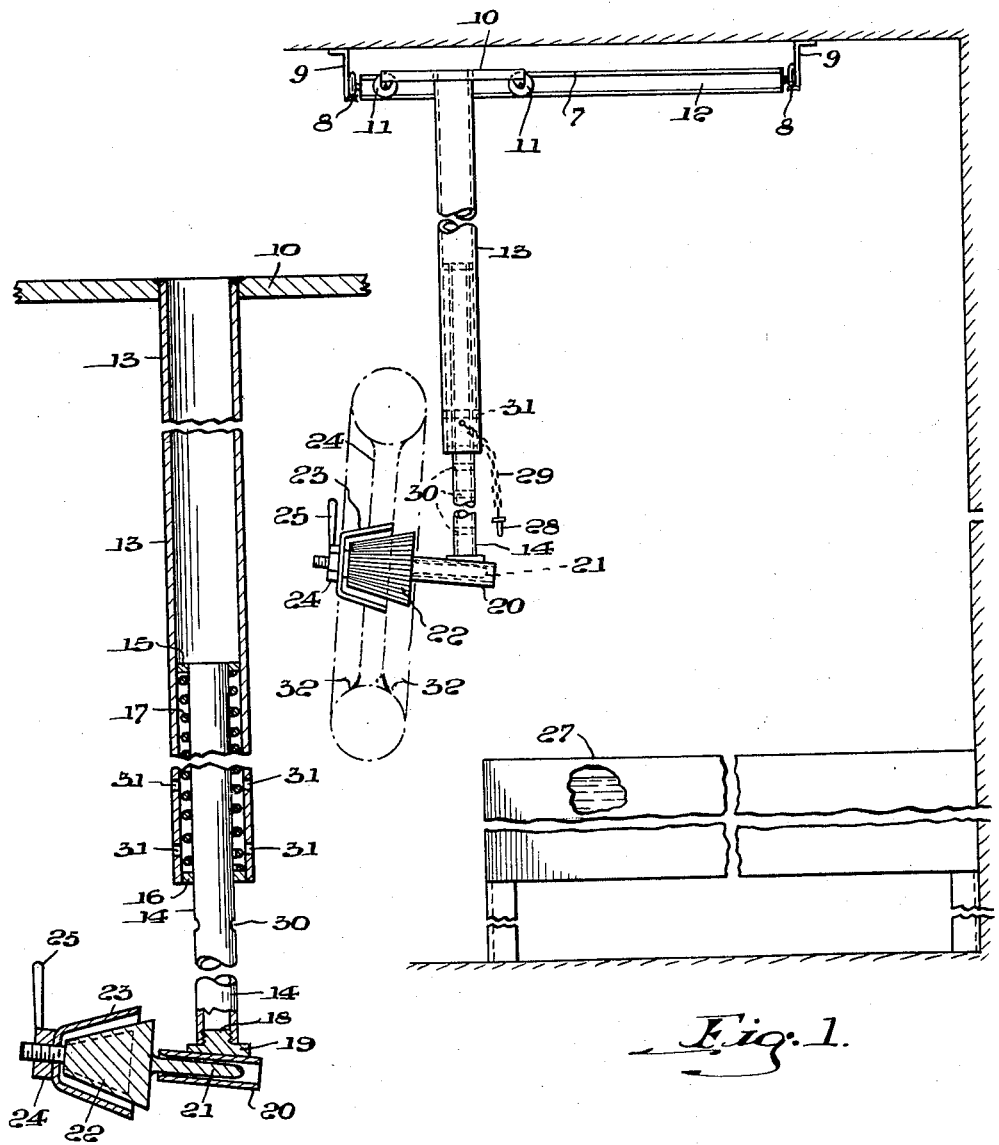
Figure 1 is a side elevational view of one form of apparatus.
Fig. 2 is an enlarged sectional view of certain of the parts of Fig. 1.

I show the apparatus as mounted on a traveling carriage 7 having wheels 8 that are movable along trackways formed by the lower flanges of Z-bars 9 whose upper flanges are secured to a ceiling of a building. An auxiliary carriage 10 has wheels 11 that move on the lower flanges of angles or channels 12 that are supported at their ends by the wheels 8.

A tubular supporting member 13 is carried by the auxiliary carriage 10 and has telescopic fit with a second tubular supporting member 14. A spring-seating ring 15 is welded around the upper end of the tube 14 and is slidable in the tube 13, and a spring-seating ring 16 is welded into the lower end of the tube 13. A spring 17 is positioned between the rings 15 and 16, and transmits weight from the ring 15 to the ring 16, thus serving to counterbalance somewhat the weight of a wheel at the lower end of the tube 14, as will be hereinafter explained.

At its lower end, the tube 14 has a plug 18 welded into it and a rib 19 on a tubular bearing 20 is welded to this plug and the tube 14. The bearing member 20 is inclined slightly upward and rotatably supports a shaft 21 that carries an arbor 22 of frustro-conical form. While the shaft and its arbor can easily be removed from the bearing 20, it is not likely to be dislodged accidentally.

The arbor is serrated or roughened on its surface. As here shown, the arbor is of a form to conveniently receive the tapered hub 23 of a wheel for a tubeless tire. A nut 24 having a crank-like handle 25 has threaded engagement with the protruding end of the shaft 21 and serves to releasably hold the wheel on the arbor.

A wheel to be tested is placed on the arbor 22 and the carriage 7 or 10 or both, as the case may be, are moved to bring the wheel into proximity to a water tank 27. Since the spring 17 counterbalances the weight of the wheel to at least some extent, so much manual force is not required to raise and lower the wheel into and out of the water bath.

A pin 28 hung from the member 13 by a chain 29 is movable into and out of holes 30 and 31, to support the wheel at a desired height either when in a bath or when being moved to a position above the tank. The tube 14 is brought down to such position that the tire will extend into the water a substantial distance, whereupon it will be rotated slightly, to ascertain whether there are leaks between the tire beads and the rims 32, such as would be evidenced by air bubbles.

The tube 14 is rotatably supported in the tube 13, so that the operator, standing at the front of the tank, can look first at one rim 32 and then swing the tube and the tire through 180° to present the other rim 32 to his view while testing.

I claim as my invention:

1. Apparatus for use in testing pneumatic tubeless tires mounted on a wheel, comprising a main vertical supporting member, means for suspending the said member, a second vertical supporting member telescopically supported by the first member and having limited vertical movement thereon, and being rotatable about a vertical axis, a laterally-extending tubular bearing sleeve carried by the lower end of the second supporting member, a stub shaft whose inner end extends loosely into the sleeve, and means on the outer end of the shaft for mounting a tire-carrying member for rotation with the shaft, the said sleeve being inclined upwardly from the said second supporting member, at a fixed angle, whereby the shaft and a tire carried thereby will remain in place until the shaft is slid outwardly from the sleeve.

2. Apparatus as recited in claim 1, wherein the means on the shaft includes an arbor of outwardly tapering frusto-conical form intermediate its ends, in position to receive a wheel hub, and a wheel-holding nut is threaded onto the outer end of the shaft.

References Cited in the file of this patent
UNITED STATES PATENTS

| | | |
|---|---|---|
| 548,899 | Wade | Oct. 29, 1895 |
| 1,784,244 | Morris | Dec. 9, 1930 |
| 1,932,302 | Browne | Oct. 24, 1933 |
| 2,154,524 | Nelson | Apr. 18, 1939 |
| 2,201,982 | Bazarek | May 28, 1940 |
| 2,659,827 | Scag et al. | Nov. 17, 1953 |

FOREIGN PATENTS

| | | |
|---|---|---|
| 894,904 | Germany | Oct. 29, 1953 |